United States Patent [19]

Esken

[11] Patent Number: 4,493,153

[45] Date of Patent: Jan. 15, 1985

[54] MEASURING APPARATUS AND METHOD OF MAKING

[75] Inventor: Robert L. Esken, Clayton, Ohio

[73] Assignee: The Bendix Corporation, Cleveland, Ohio

[21] Appl. No.: 540,096

[22] Filed: Oct. 7, 1983

Related U.S. Application Data

[63] Continuation of Ser. No. 205,206, Nov. 10, 1980, abandoned.

[51] Int. Cl.$^3$ .............................................. G01B 7/12
[52] U.S. Cl. ................... 33/149 J; 33/143 L; 33/147 K; 33/178 E
[58] Field of Search .............. 33/149 J, 149 R, 143 R, 33/143 L, 148 R, 148 H, 178 R, 178 E

[56] References Cited

U.S. PATENT DOCUMENTS

| | | | |
|---|---|---|---|
| 2,229,748 | 1/1941 | Lawrence | 33/178 R |
| 2,468,496 | 4/1949 | Ingle | 33/148 R |
| 2,662,297 | 12/1953 | Reicherter | 33/178 R |
| 3,922,792 | 12/1975 | Ito | 33/143 L |
| 4,067,114 | 1/1978 | Meyer, Jr. | 33/178 R |
| 4,211,014 | 7/1980 | Költgen | 33/178 R |
| 4,238,886 | 12/1980 | Brown | 33/149 J |
| 4,279,079 | 2/1981 | Gamberini et al. | 33/149 J |
| 4,329,782 | 5/1982 | Possatti et al. | 33/178 E |

Primary Examiner—Willis Little
Attorney, Agent, or Firm—Kenneth A. Seaman

[57] ABSTRACT

A measurement apparatus (10) for measuring a dimension between two surfaces (26, 27) on a workpiece (20) in which the apparatus includes a pair of gaging tips (310, 320) for engaging the surfaces. The gaging tips are mounted toward the end of a spindle (120) and extend outwardly (perpendicularly) therefrom. The gaging tips (310, 320) are moved inwardly by the surfaces (26, 27), with the amount of inward movement being dependent on the distance between two surfaces. The inward movement of the gaging tips is sensed by a one piece flexible member (200), preferably in the shape of an "H", which has parallel legs (230, 240) compressed and pivoted about its central portion (250) by the inward movement of said tips. The flexible member is mounted rewardly of the contact tips by a thin pivot portion (224) to a housing. A transducer (400) mounted within the housing and coupled to one of the arms of the flexure member measures the pivoting displacement of the other arm, and thus the flexure as a result of the compression by the gaging tips, thereby measuring the dimension between the two surfaces.

16 Claims, 7 Drawing Figures

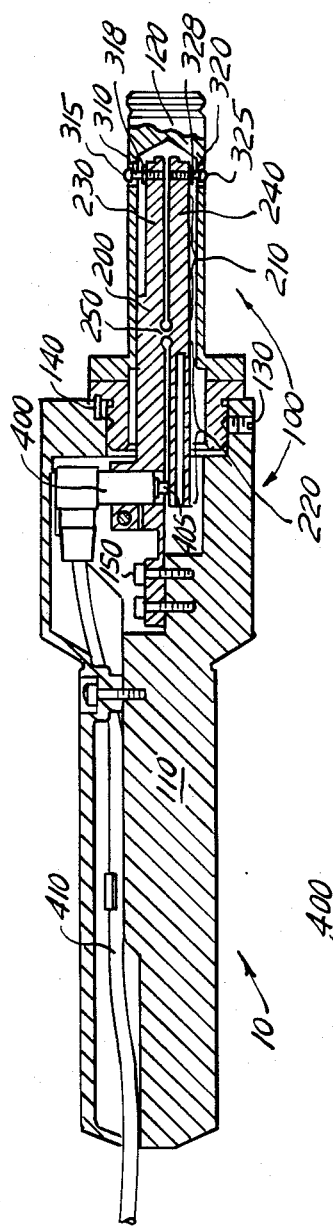

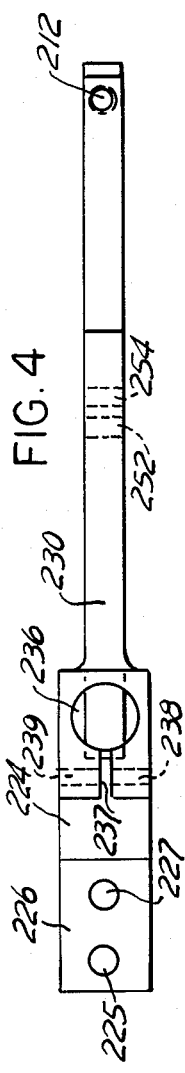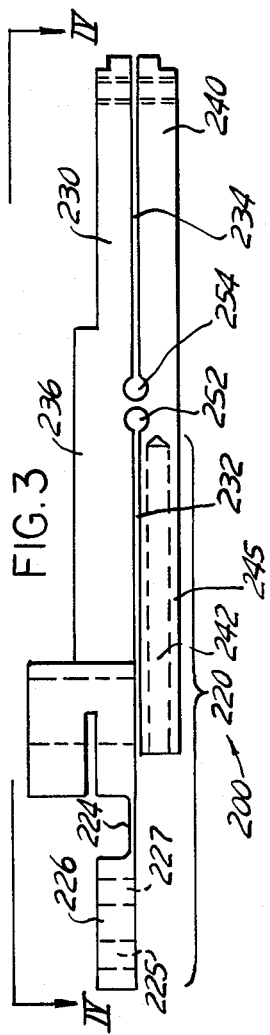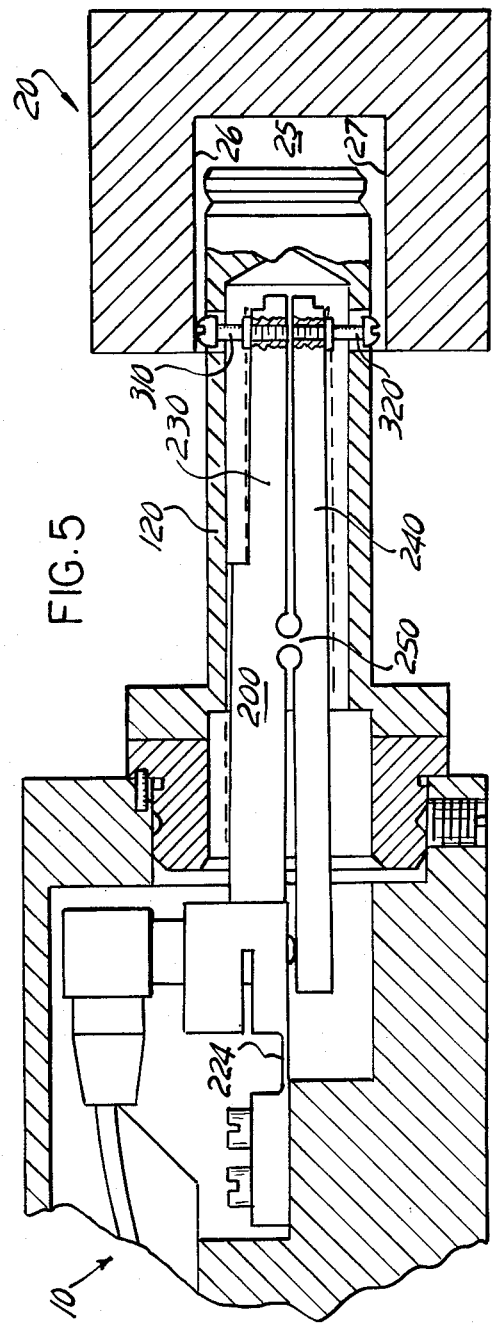

4,493,153

MEASURING APPARATUS AND METHOD OF MAKING

This application is a continuation of Ser. No. 205,206, filed Nov. 10, 1980, abandoned.

BACKGROUND OF THE INVENTION

The present invention relates to a measuring apparatus and method of making it, particularly for measuring a diameter of a hole or distance between surfaces and a method of making the apparatus. The present invention has particular applicablity to measuring of small bores by insertion of a gage portion therein.

Measurement apparatus for measuring distance between two surfaces (or the diameter of a bore or hole) have been known for some time. In such systems, it is desirable to measure accurately the distance between two closely-position surfaces. A mechanical apparatus including the elements necessary for a mechanical measurement must be small to be inserted into such a small area. In view of the small access area, it is frequently necessary to measure these dimensions indirectly as by movable gaging tips which engage the surfaces and a movable tapering stylus to measure the separation between the tips by the contact tips. Such a stylus makes a frictional engagement with the contact tips which provide inaccuracies and do not lend themselves to highly repeatable measurements. Additionally, the stylus must be accurately manufactured, and may wear during use, leading to inaccuracies in measurements.

Such systems also lack, in some instances, an interchangeable spindle, requiring that the entire gaging assembly (spindle and measuring elements) be provided for each range of dimensions. In measurement systems, it is desirable to have a probe assembly which a portion is common fitted with interchangeable spindles which can measure various diameter holes with accuracy. For example, a particular spindle may measure the diameter of holes between 20 and 25 millimeters. To measure a hole of approximately 30 millimeters, a different spindle will be required and advantageously would fit onto a common measuring element. It is advantageous that merely the front spindle be changed and the rear measuring elements, including gaging cartridge, handle assembly and coupling to a readout system, not be changed for each change in dimension to be measured.

Some examples of prior art devices which are suited for such measurement are shown in U.S. Pat. Nos. 2,665,496; 2,239,981; and 2,781,585.

Of course, it has been suggested in the prior art to provide an air gaging apparatus for measuring diameters of holes and other distances between surfaces. Such gages work reasonably well to an inherent accuracy, but it is time-consuming and expensive to make an accurate air gage and requires costly know-how to set up. Further, air gages require a source of air under constant pressure and other miscellaneous devices such as pressure regulators and filters which may not be available in many manufacturing environments. Accordingly, such air gage apparatus have undesirable limitations and disadvantages for some measuring applications. Example of such air gaging spindles and/or systems are shown in U.S. Pat. Nos. 2,926,523; 2,755,558; 2,995,921; 2,914,860; 2,889,704; and others.

Accordingly, the foregoing prior art gaging apparatus has significant limitations and disadvantages.

SUMMARY OF THE INVENTION

The present invention overcomes the limitations and disadvantages of the prior art by providing a gaging apparatus which is simple, easy to construct, accurate to use and has a high degree of repeatability and a relatively long life.

The present invention in its preferred embodiment is characterized by a pair of gaging tips which compress elongated arms of an "H" shaped flexure member to pivot it about its transverse portion. The amount of pivoting of the arms is measured by a transducer, which is preferably mounted within the housing and coupled to one of the longated arms to measure the displacement of the other arm with respect thereto the flexure member. A second flexure pivot, near the mounting of the flexure to the housing, allows the gaging tips to maintain contact with the part (and perhaps entered therein, if desired) even if the housing and spindle are moved radially within an aperture. The second flexure is preferably adjusted so as to always have a slight deflection, to permit movement of the spindle and housing in any direction.

The present invention has the advantage that there is no friction or sliding contact between measuring elements to provide wear or nonrepeatable measurements.

The present invention has the advantageous effect that very accurate measurements may be made with relative ease, even when a bore of relatively small sizes being inspected.

The present invention also has the advantage that gaging spindles are interchangeably coupled to and mounted on said housing, so that a common transducer and flexure member may be used for a measuring a wide range of dimensions.

The present invention also has the advantage that a relatively light and compact measuring apparatus may be made without sacrificing measuring accuracy or repeatability.

A further advantageous effect of the present invention is that the measuring apparatus has a relatively long life and does not significantly wear, so that measurements are highly accurate and also highly repeatable. The apparatus is not dependent on the previous measurements or the amount of wear of the parts which may be induced in other gages after the gage has been used repeatedly. Of course, the flexure of the present invention may be of a different shape and nevertheless function well. In this regard, a "U" shaped flexure could be used to advantage.

The present invention also has the advantage that it includes a minimum number of parts, reducing manufacturing inventory and assembly costs.

The foregoing and other objects and advantages of the present invention will be apparent to one skilled in the art in view of the following detailed description of the drawings and the appended claims.

BRIEF DESCRIPTION OF THE DRAWINGS

FIG. 1 is a cross-sectional view of a measuring apparatus of the present invention.

FIG. 2 is a perspective view of a blank which can be made into a flexure member for use in the measuring apparatus of FIG. 1.

FIG. 3 is a side view of a manufactured flexure member, made from the blank of FIG. 2 prior to assembly into the measuring apparatus of FIG. 1.

FIG. 4 is a plan view of the flexure member of FIG. 3, looking along the line IV—IV in the direction of the arrows.

FIG. 5 is a cross-sectional view of the measuring apparatus of the present invention partially engaging an aperture to be measured.

FIG. 7 is a cross-sectional view of an alternate embodiment of the present invention.

DETAILED DESCRIPTION OF THE DRAWINGS

Figure 6:
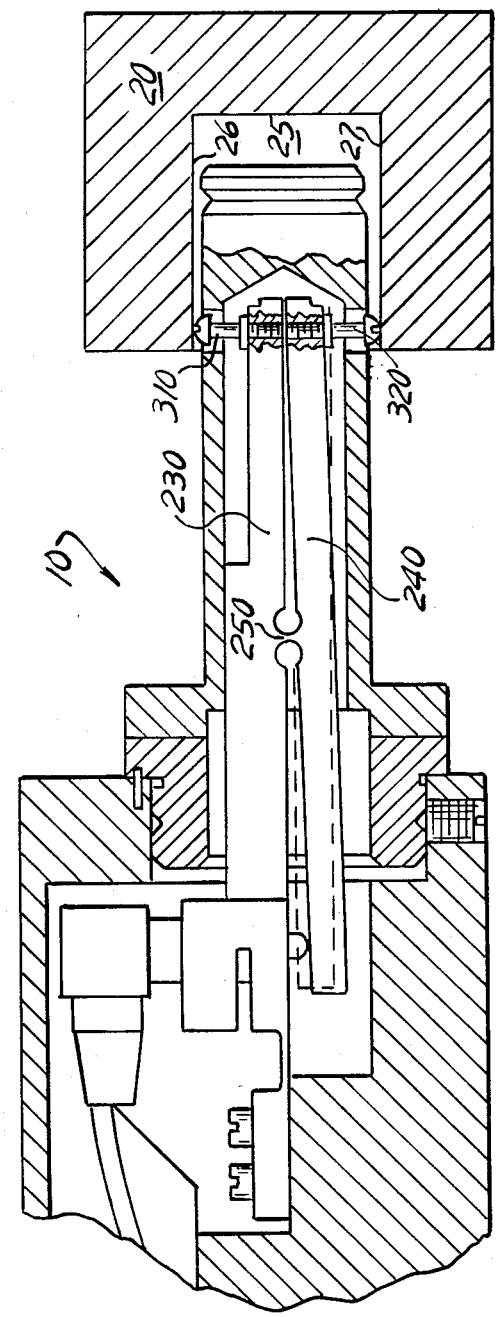
FIG. 6 is a cross-sectional view of the measuring apparatus of FIG. 5 fully engaging the aperture to be measured.

FIG. 1 is a cross-sectional view of a measuring apparatus 10 of the present invention. The measuring apparatus 10 includes a housing 100, a flexible gaging element 200, gaging tips 310, 320 and an electromechanical transducer 400.

The housing 100 preferably includes a rear portion 110 and a forward or spindle portion 120. The two parts are coupled together by several screws 130 (only one shown) and have a locating pin 140 for orientating and locating the spindle portion 120 radially with respect to the rear portion 110. The housing rear portion 110 may be made in several components for ease in assembly and may include such amenities as grips and cable mountings for.

The flexible gaging elememt 200 is shown in this view. Its structure, a method of making it and its detailed characteristics are explained later in connection with FIGS. 2-6 below, to which reference should be made for specific information. The flexible gaging element 200 is spring-like and includes a forward region 210 and a rear region 220 and comprises two elongated arms 230, 240 coupled medially by a relatively short transverse or pivotal portion 250. The elongated arms are generally parallel and, with the transverse portion 250 form a member generally in the shape of the letter "H". The member 200 is coupled in its rear region 220 to the housing 100 by a plurality of screws 150.

The gaging tips 310, 320 include an outer arcuate portion 315, 325, respectively, for engaging the surfaces respectively of the part to be measured. The outer arcuate portions 315, 325 are generally hemispherical in the preferred embodiment and made of a hardened, nondegrading material. The gaging tips 310, 320 are moveably mounted to the spindle 120 to allow displacement along a single axis perpendicular to the spindle for measurement. The gaging tips 310, 320 have interior portions 318, 328 (within the spindle 120) which engage the flexible gaging element 200 in the forward region 210 to displace the elongated arms 230, 240 by pivoting them about the transverse portion 250 in response to forces (i.e., a surface to be measured), by an amount proportional to the displacement inwardly of the gaging tips 310, 320.

The transducer 400 is coupled to the upper elongated arm 230 of the flexure member 200 and measures the relative displacement of the other elongated arm 240 of the flexure member 200, preferably mounted rearwardly of the transverse portion 250 and approximately as far rearwardly of the transverse portion 250 as the gaging tips 310 engage the arms forwardly of the transverse portion 250.

The transducer 400 is preferably an electromechanical transducer which provides an electrical signal indicative of linear displacement of a transducer tip 405. The electrical signal is provided on an electrical cable 410. The signal is suitable for processing by known circuitry for display by a measurement indicating display apparatus of a type which is well known in the art. One such transducer is sold by The Bendix Corporation, Automation & Measurement Division, of Dayton, Ohio, as an "Electrojet" brand transducer. One such display apparatus for indicating a measurement is shown in U.S. Pat. No. 3,825,827 relating to an Electronic Column issued to Tumbush. Many other types of displays and transducers are well known in the art and are merely a matter of design choice for use with the present invention and merely incidental thereto.

FIG. 2 is a perspective view of a blank 200', which is a partially-formed flexure member as initially made and prior to the completion of the manufacturing process. The blank 200' includes a forward section 210', a rear section 220' and a mounting portion 280'.

The blank 200' or partially-formed flexure member is preferably cast in the shape shown and preferably made out of type 416 stainless steel, although other materials having both strength and spring-type resiliency could be used to advantage.

FIG. 3 a side view of the manufactured flexure 200, which is the partially-formed flexure or blank 200' of FIG. 2 after it has been manufactured to have the structure and function of the present invention, but prior to assembly into the measurement apparatus of FIG. 1. Two holes 252, 254 have been drilled through the flexure 200 to the define ends of slots 232, 234 defining the elongated arms 230, 240. The region between the holes 252, 254 is the transverse member 250. A strengthening rib 236 extends along the upper surface of the arm 230.

The arm 240 at its rear portion has a hollowed hole 242 extending forwardly from the rear. The hole 242 makes the arm 245 lighter in weight and therefore less subject to distort measurements as the apparatus is moved into diverse orientations (i.e., horizontal compared to vertical).

The rear region 220 includes a relatively thin region 224 which is forward of a mounting portion 226. The flexure member 220 is coupled to the housing for operation by screws (not shown in this view) inserted through holes 225, 227. The thin region 224 allows the entire flexure to pivot or flex with respect to the mounting portion 226.

FIG. 4 is a top view of the flexure member 200 showing the rear mounting portion 226 and the thin portion 224 forwardly thereof, the transverse portion (or member) 250, and a forward socket 212 for receiving contact tips. A transducer-receiving aperture 236 extends down through the upper elongated arm 230 and has a slit 237 and holes 238, 239 extending therethrough. The hole 239 is tapped to provide threads for retaining a screw therein, with the screw being mounted in the holes 238, 239 for compressing the flexure material about the transducer mounted in the aperture 236 to secure the transducer therein.

FIG. 5 is a cross-sectional partial view of the measuring apparatus 10 mounted in a part 20 having an aperture 25 to be measured. The aperture 25 is defined by walls 26, 27 with one contact tip 310 engaging the wall 26 but the other contact tip 320 being spaced from the wall 27. Contact of the wall 26 by the contact tip 310 causes a pivoting or flexing of the entire flexure member 200 about the thin (or pivot) region 224.

In assembling and arranging the parts of the present invention, the thin pivot region 224 is preferably located with respect to the spindle 120 and the flexure 200 to allow have at least a slight deflection to allow movement of the spindle in either direction while allowing the tips to remain centered. A small preload force on the pivot region 224 may be desirable to allow member 200 to remain centered and able to move in either direction in response to spindle movement.

FIG. 6 is a partial view of the measuring apparatus 10 mounted in the aperture 25 of the part 20 with contact tips 310, 320 being in engagement with (and compressed by) the walls 26, 27. Such compressing of the tips 310, 320 causes a bending of the arms 230, 240 about the transverse section 250, causing a displacement which can be measured by the transducer 400. The unpivoted (free) position of the flexure member 200 is shown by dotted lines.

FIG. 7 is a cross-sectional view of an alternate embodiment of a measuring apparatus 700 embodying the present invention. In this view, the measuring apparatus 700 includes a body 710, a spindle 720, gaging tips 730, 740 and a flexure 750 shaped generally in the shape of a "U" having two legs 752, 754 and a rear mounting region 756. The flexure 750 has two regions about which it can pivot—a base 757 of the "U" (as by compression of the legs 752, 754 together) and a thinned wall (or pivot region) 758 for centering of lateral displacement of the entire flexure 750. Again, the flexure 750 is preferably slightly deflected about the pivot displacement of the entire flexure 750 in either direction.

The foregoing description of the preferred embodiment is merely exemplary of the present invention. The structure shown and described may be modified in one or more of several ways which are known to those skilled in the art. Further, some of the features of the present invention may be used without the corresponding use of other features. For example, in place of the electrical transducer described and shown, an air gaging cartridge may be substituted or another type of transducer, such as a piezoelectric transducer, might be used to advantage. It is also feasible, though more expensive, to use more than one transducer. Accordingly, the present description should be considered as merely illustrative of the present invention and should not be interpreted as limiting the scope of the invention, which is defined solely by the following claims.

Having thus described the invention, what is claimed is:

1. A measuring apparatus for measuring distance between two surfaces, said measuring apparatus comprising:
   a housing;
   contact tips for engaging the surface to be measured;
   means for mounting the contact tips to the housing while allowing the tips to displace with respect to the housing in response to contact with the surfaces to be measured, said mounting means comprising a one-piece spring member mounted to the housing toward one end of the spring member, said spring member including a pair of flexible arms extending outwardly and coupled medially at an integral cross member, said arm pivoting about the cross member in response to movement of one of the tips; and
   means for measuring the pivotal movement of the spring members as an indication of the displacement of said contact tips, thereby indicating the distance between the surfaces, said measuring means being coupled to the housing and at least one of said flexible arms.

2. A measuring apparatus of the type described in claim 1 wherein the measuring means comprises a transducer which provides an electrical signal indicative of the pivoting of the flexible arm.

3. A measuring apparatus of the type described in claim 1 wherein said spring member is in the general shape of an H.

4. A measuring apparatus of the type described in claim 1 wherein said flexure arm includes beams which are coupled together at a medial location which is approximately equal distance from the location of the measuring means and the contact tips.

5. An apparatus for measuring distance between two points comprising:
   a housing;
   means mounted to said housing for engaging the two points and displacing a measurable amount in response to the distance between the two points;
   a spring assembly having two elongated arms and a coupling extending therebetween generally perpendicular to the arms, said assembly being fixed to the housing at one end of the arms and having a coupling to the engaging means at the other end thereof; and
   means for measuring the amount of the spring assembly displacing as an indication of the distance between two points.

6. A measuring apparatus of the type described in claim 5 wherein said engaging means is mounted to the housing by a pivotal mounting.

7. A measuring apparatus of the type described in claim 6 wherein the pivotal mounting is preloaded to allow a displacement in a plurality of directions.

8. In an apparatus for measuring a bore of the type including a housing an outwardly extending spindle insertable into said bore and having a pair of moveable contact tips extending outwardly from said spindle, each of said contact tips engaging one wall of said bore, and being displaced by the loss of the bore, said apparatus including means for measuring the amount of movement of said contact tips by said bore, the improvement wherein the means for measuring the displacement of the contact tips comprises a one piece spring element having a bifurcated legs extending forwardly into the spindle, at least one leg of which is mounted to the housing, with the legs capable of resilient displacement inwardly, said bifurcated element including one leg associated with each of said contact tips for displacing inwardly in response to inward movement of the associated contact tip and means for measuring the inward movement of the bifurcated arm.

9. A measuring apparatus of the type described in claim 8 wherein the means for measuring the inward movement of the arm comprises means mounted to one of the arms for retaining a transducer in fixed relationship therewith, said transducer including a measuring tip for engaging the other arm and measuring displacement of the other arm with respect to said first.

10. A measuring apparatus of the type described in claim 9 wherein said bifurcated arms are coupled together immediately by an integral member piece creating an "H" shaped unitary piece structure.

11. A measuring apparatus of the type described in claim 10 wherein the "H" shaped structure is secured to the housing by mounting it toward one end of the parallel members and the other end is adjacent the contact tips.

12. In a measuring apparatus for measuring distance between two surfaces, said apparatus having a body, a hollow spindle extending from the body and a pair of contacting tips movably mounted to the spindle and extending outwardly therefrom for engaging the surfaces, and an internal biasing means mounted to the body and extending into the hollow spindle to bias the contact tips outwardly, the improvement wherein:

the biasing means is a one-piece bifurcated member having two legs pivotally coupled together and being pivotally mounted to the housing; and means mounted to one leg of the bifuracted member for measuring the pivoting between the legs of the bifurcated member as an indication of the distance between the surfaces.

13. A measuring apparatus for measuring the diameter between opposite sides of a hole, said measuring apparatus comprising:

a housing;

a pair of contact tips for engaging the opposite sides of the hole whose diameter is measured;

means for mounting the contact tips to the housing while allowing the tips to displace with respect to the housing in response to contact with the opposite sides of the hole to be measured, said mounting means comprising a one-piece unitary spring member mounted to the housing toward one end of the spring member with the contact tips, said spring member including a pair of flexible arms extending outwardly and coupled medially at an integral cross member, said arm pivoting about the cross member in response to movement of one of the tips; and means for measuring the pivotal movement of the spring members an an indication of the displacement of said contact tips, thereby indicating the distance between the surfaces, said measuring means being coupled to the housing and at least one of said flexible arms at a location on the opposite end of the flexible arm from the contact tips.

14. A measuring apparatus for measuring distance between two surfaces, said measuring apparatus comprising:

a housing;

contact tips for engaging the surfaces to be measured;

means for mounting the contact tips to the housing while allowing the tips to displace with respect to the housing in response to contact with the surfaces to be measured, said mounting means comprising a one-piece spring member mounted to the housing toward one end of the spring member, with said spring member including a pivot adjacent its mounting to the housing, said spring member including a pair of flexible arms extending outwardly and coupled medially at an integral cross member, said arm pivoting about the cross member in response to movement of one of the tips; and means for measuring the pivotal movement of the spring members as an indication of the displacement of said contact tips, thereby indicating the distance between the surfaces, said measuring means being coupled to the housing and at least one of said flexible arms.

15. A measuring apparatus of the type described in claim 14 wherein the measuring means comprises a transducer which provides an electrical signal indicative of the pivoting of one flexible arm with respect to the other as an indication of the distance between the two surfaces.

16. A measuring apparatus of the type described in claim 14 wherein said spring member is in the general shape of an H having two flexible arms connected medially along the length thereof by a medial portion, with the contact tips projecting outwardly from opposed arms toward one end of the uprights and the measuring means being mounted between the uprights separated from the contact tips by the medial portion of the H.

* * * * *